US012398946B2

(12) United States Patent
Denison et al.

(10) Patent No.: US 12,398,946 B2
(45) Date of Patent: Aug. 26, 2025

(54) RETAIL CONTROLLER SYSTEM

(71) Applicant: Triteq Lock and Security, LLC, Elk Grove, IL (US)

(72) Inventors: William Denison, North Barrington, IL (US); Calin Roatis, Long Grove, IL (US)

(73) Assignee: TriTeq Lock and Security, LLC, Elk Grove Village, IL (US)

( * ) Notice: Subject to any disclaimer, the term of this patent is extended or adjusted under 35 U.S.C. 154(b) by 0 days.

(21) Appl. No.: 19/035,665

(22) Filed: Jan. 23, 2025

(65) Prior Publication Data

US 2025/0198687 A1 Jun. 19, 2025

Related U.S. Application Data

(63) Continuation of application No. 18/144,066, filed on May 5, 2023, which is a continuation of application
(Continued)

(51) Int. Cl.
*E05B 47/00* (2006.01)
*E05B 47/06* (2006.01)
(Continued)

(52) U.S. Cl.
CPC ........ *F25D 23/028* (2013.01); *E05B 47/0603* (2013.01); *E05B 65/0046* (2013.01); *E05B 65/0811* (2013.01); *E05B 47/00* (2013.01); *E05B 47/0001* (2013.01); *E05B 47/0012* (2013.01); *E05B 2047/0024* (2013.01); *E05B 2047/0069* (2013.01); *E05B 73/00* (2013.01); *E05B 73/0005* (2013.01); *E05B 73/0017* (2013.01); *E05B 73/0082* (2013.01); *Y10T 70/40* (2015.04); *Y10T 70/5009* (2015.04);
(Continued)

(58) Field of Classification Search
CPC .... F25D 23/028; E05B 47/00; E05B 47/0603; E05B 65/0046; E05B 65/0811; E05B 47/0001; E05B 47/0012; E05B 73/00; E05B 73/0005; E05B 73/0017; E05B 73/0082; E05B 2047/0024; E05B 2047/0069; Y10T 70/5009; Y10T 70/70; Y10T 70/625; Y10T 70/7006; Y10T 70/40
See application file for complete search history.

(56) References Cited

U.S. PATENT DOCUMENTS 5,345,379 A * 9/1994 Brous ................ G06Q 20/3437 235/382
6,102,162 A * 8/2000 Teicher ............... G07F 17/0042 186/39
(Continued)

*Primary Examiner* — Suzanne L Barrett
(74) *Attorney, Agent, or Firm* — Charles T. Riggs, Jr.

(57) ABSTRACT

A cooler access control system locks a cooler when occurrence of an event is detected that requires limiting access to the inside of the cooler. Examples of such events include the loss of power to the cooler for a predetermined period of time, the opening of the cooler door for longer than an allowed time, the loss of functionality of a temperature probe and others. In an embodiment, a service mode is supported wherein the door is left unlocked despite the occurrence of such an event, to allow a stocker or other personnel to leave the cooler door open while stocking the cooler with product.

39 Claims, 17 Drawing Sheets

Related U.S. Application Data

No. 18/120,712, filed on Mar. 13, 2023, which is a continuation of application No. 17/952,984, filed on Sep. 26, 2022, now Pat. No. 11,629,905, which is a continuation of application No. 17/699,681, filed on Mar. 21, 2022, now Pat. No. 11,493,262, which is a continuation of application No. 16/750,680, filed on Jan. 23, 2020, now Pat. No. 12,235,034, which is a continuation of application No. 15/965,322, filed on Apr. 27, 2018, now Pat. No. 10,584,912, which is a continuation of application No. 13/930,664, filed on Jun. 28, 2013, now Pat. No. 10,591,201.

(60) Provisional application No. 61/754,332, filed on Jan. 18, 2013.

(51) Int. Cl.

| | |
|---|---|
| ***E05B 65/00*** | (2006.01) |
| ***E05B 65/08*** | (2006.01) |
| ***F25D 23/02*** | (2006.01) |
| *E05B 73/00* | (2006.01) |

(52) U.S. Cl.
CPC .............. *Y10T 70/625* (2015.04); *Y10T 70/70* (2015.04); *Y10T 70/7006* (2015.04)

(56) References Cited

U.S. PATENT DOCUMENTS

| | | | | |
|---|---|---|---|---|
| 7,728,711 | B2 * | 6/2010 | Shoenfeld | E05B 47/0012 340/5.1 |
| 10,495,377 | B2 * | 12/2019 | Linney, II | F25D 23/028 |
| 10,520,242 | B2 * | 12/2019 | Denison | E05B 65/0046 |
| 10,584,911 | B2 * | 3/2020 | Denison | E05B 65/0811 |
| 10,584,912 | B2 * | 3/2020 | Denison | F25D 23/028 |
| 10,591,201 | B2 * | 3/2020 | Denison | F25D 23/028 |
| 10,612,833 | B2 * | 4/2020 | Denison | E05B 47/0603 |
| 10,739,060 | B2 * | 8/2020 | Denison | E05B 65/0811 |
| 10,775,097 | B2 * | 9/2020 | Denison | F25D 23/028 |
| 10,829,960 | B2 * | 11/2020 | Denison | E05B 47/0603 |
| 11,493,262 | B2 * | 11/2022 | Denison | E05C 3/24 |

* cited by examiner

RETAIL CONTROLLER SYSTEM

RELATED APPLICATIONS

This application is a continuation of U.S. application Ser. No. 18/144,066 entitled "Cooler Lock," filed on May 5, 2023, which is a continuation of U.S. application Ser. No. 18/120,712 entitled "Cooler Lock." filed on Mar. 13, 2023, which is a continuation of U.S. application Ser. No. 17/952,984 entitled "Cooler Lock," filed on Sep. 26, 2022, which is a continuation of U.S. application Ser. No. 17/699,681 entitled "Cooler Lock." filed on Mar. 21, 2022, which is a continuation of U.S. application Ser. No. 16/750,680 entitled "Cooler Lock," filed on Jan. 23, 2020, which is a continuation of U.S. application Ser. No. 15/965,322 entitled "Cooler Lock." filed on Apr. 27, 2018, which is a continuation of U.S. application Ser. No. 13/930,664, entitled "Cooler Lock" filed on Jun. 28, 2013, which is related to and claims priority to U.S. Provisional Application Ser. No. 61/754,332, entitled "Cooler Lock," filed on Jan. 18, 2013, which applications are herein incorporated by reference in their entirety for all that they suggest, disclose, and teach, without exclusion of any portion thereof.

TECHNICAL FIELD OF THE DISCLOSURE

The disclosure is directed generally to enclosure locking mechanisms, and, more particularly, to an access control system that includes features for providing locking and access to a refrigerated cooler. The lock mechanism consists of a strike mounted on the door or cabinet, and a motor-controllable latch mounted on the other of the door or cabinet.

DETAILED DESCRIPTION

A refrigerated cooler typically consists of a refrigerated cabinet to hold food and beverages and a glass door that swings outward via a hinge. Typically the door or the cabinet has a rubber gasket or other flexible sealing element (collectively "gasket") along the edge to create a barrier between the cold air inside the cabinet and the warm air outside the cabinet. The gasket further serves to accommodate misalignments between the cabinet and the door, when for example the cooler is placed on a floor that is not level such that the structure is twisted, or when over time the door droops downward from the hinge and fails to maintain alignment with the cabinet. Typically the inner surface of the door will interface to the outer surface of the cabinet, and as such the door usually does not reside on the interior of the cabinet. Typically the door is held to the edge surface of the cabinet by a magnet. In addition, typically the door is hung and the hinge is aligned such that the door is naturally biased to swing toward the cabinet without applying an external force to a surface of the door.

When the door is opened, e.g., by a consumer in order to retrieve product, and is then released, the door will naturally swing toward the closed position. As the door reaches the closed position from the open position, its movement is accelerating slightly and needs to be stopped. The gasket will serve to absorb some of the energy released by the door as it abruptly stops. The magnet serves to some extent to maintain the door in the closed position and the magnet and the gasket together also serve to minimize the amount of bounce the door may exhibit as it moves to a stopped position.

Figure 1A:
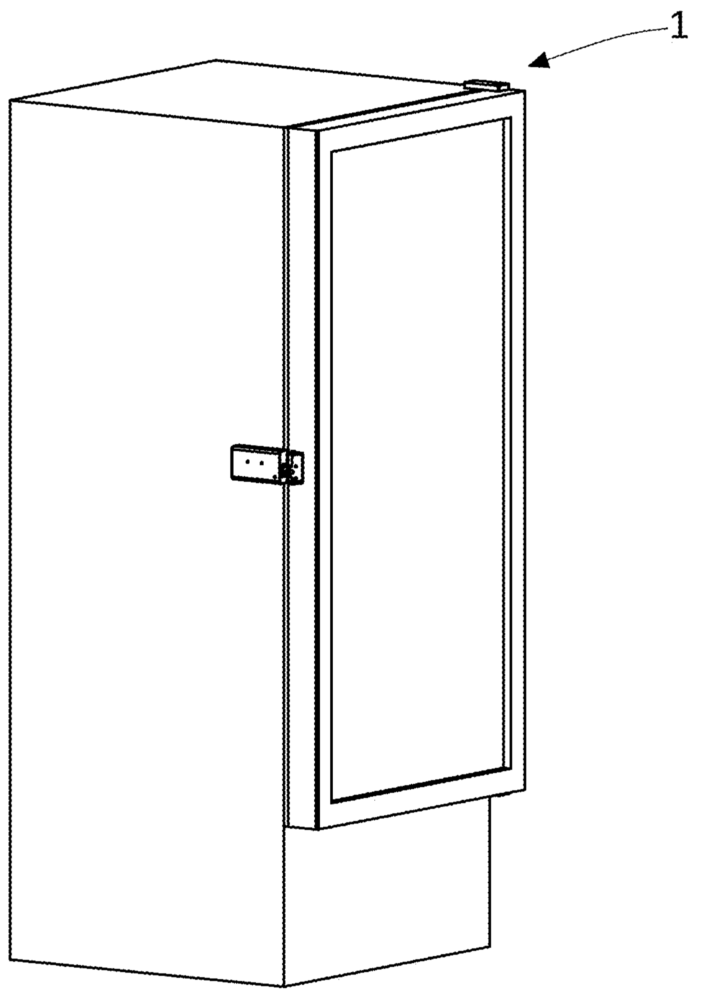
FIG. 1A is a simplified perspective view of a cooler structure within which aspects of the disclosure may be implemented.
Figure 1B:
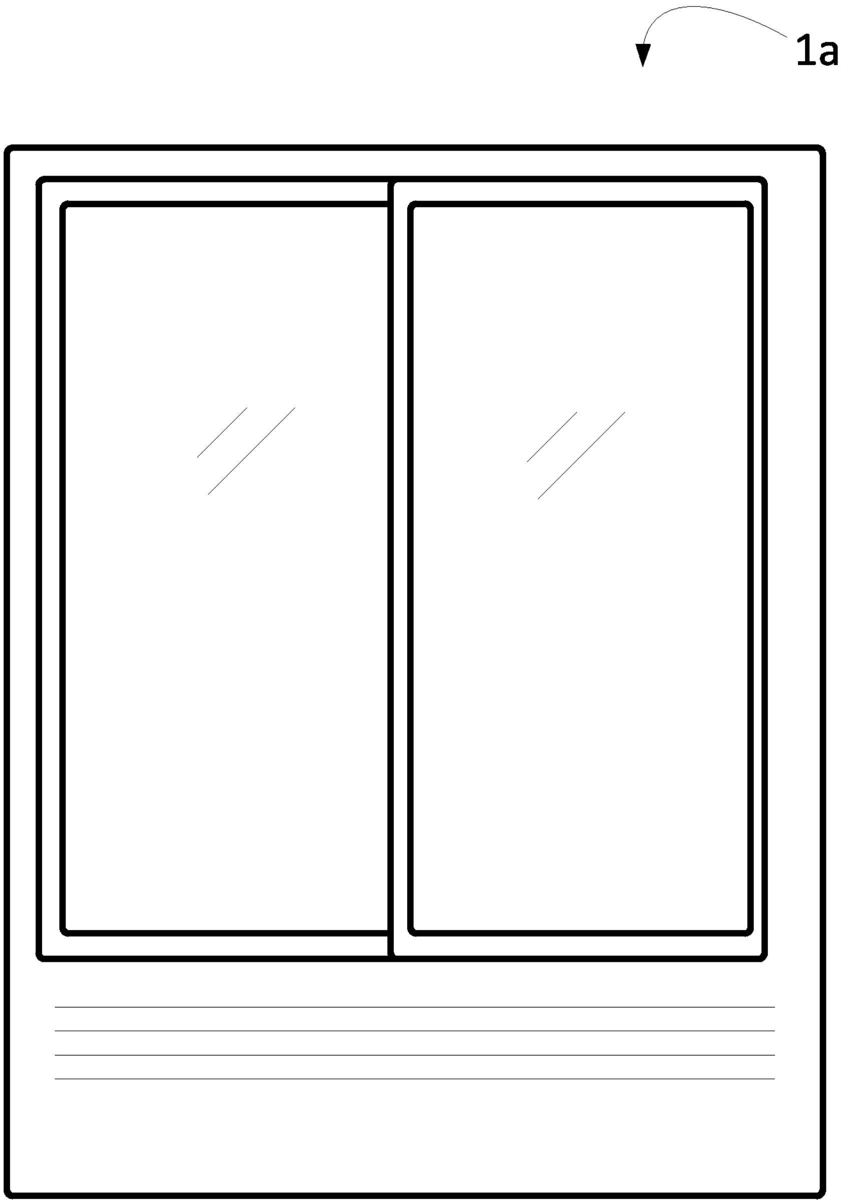
FIG. 1B is a simplified perspective view of an alternative cooler structure within which aspects of the disclosure may be implemented.
Figure 2:
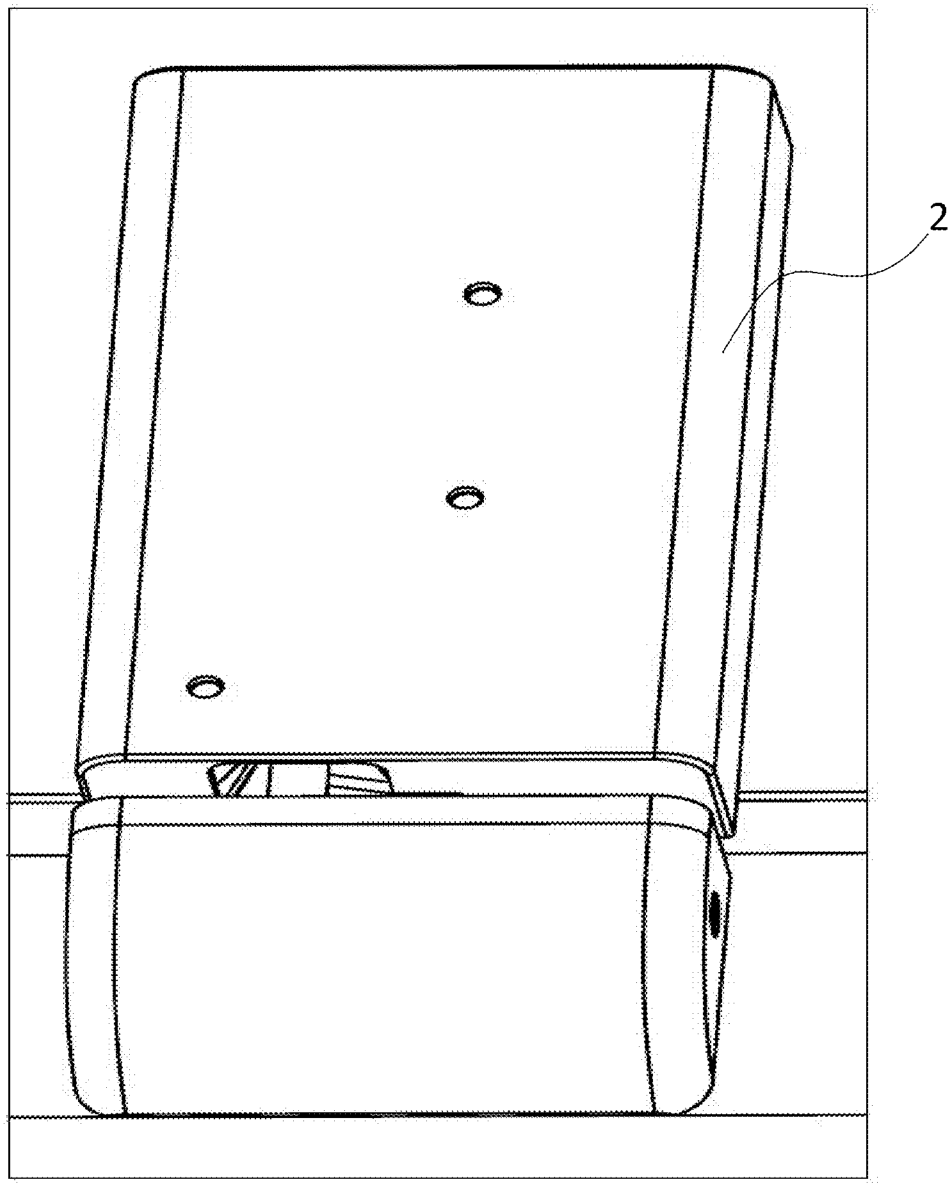
FIG. 2 is an enlarged perspective view of a cooler locking structure in accordance with an aspect of the disclosure.
Figure 3:
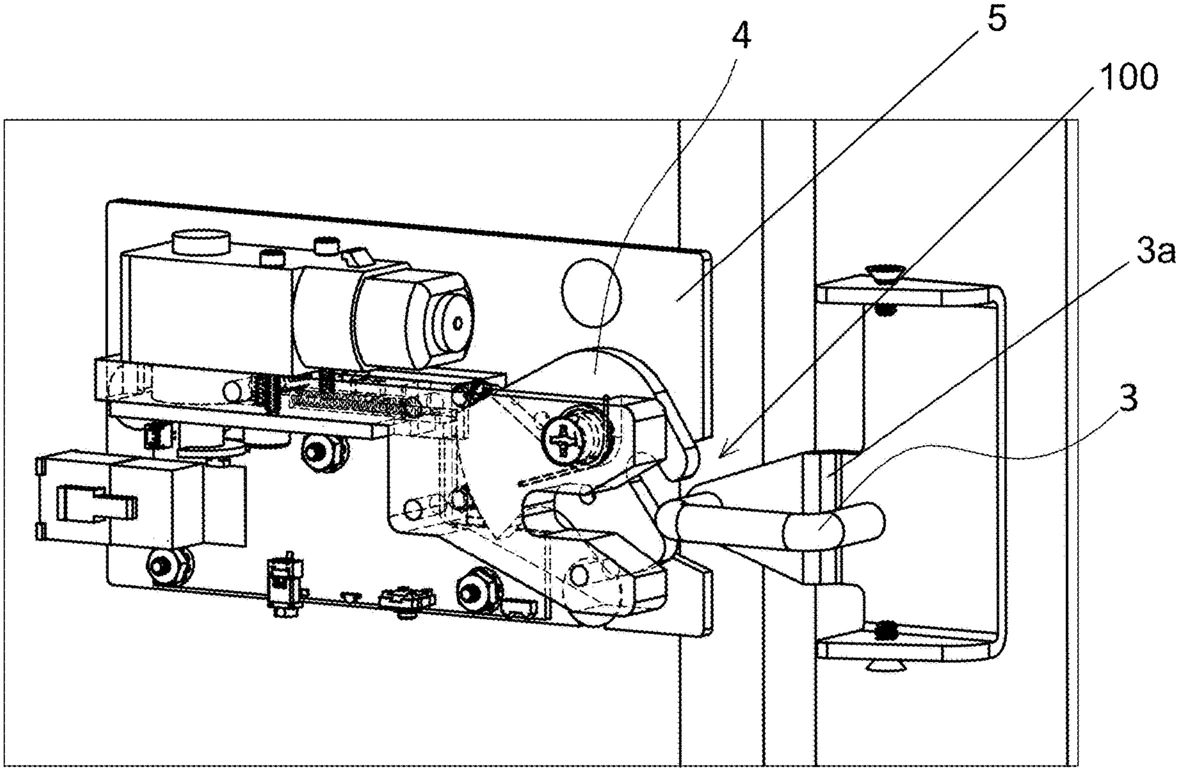
FIG. 3 is simplified interior view of the cooler locking structure of FIG. 2 in accordance with an aspect of the disclosure.

FIG. 1A is a perspective view of a cooler 1 within which embodiments of the invention may be implemented. FIGS. 2 and 3 illustrate the lock mechanism 2 mounted to the cooler 1, showing the lock 2 while the strike 3 is entering the latch 4, and the strike base 3*a* is entering the opening 100 in mounting base 5. The mechanism may be mounted in a door centered position on the vertical edge of the door/cabinet as shown in FIG. 1, and it can be mounted at the top or bottom of the door/cabinet at the vertical edge or along either of the horizontal edges at the top or bottom of the door/cabinet in order to hide or protect the mechanism from the reach of customers. In an embodiment shown, the lock mechanism is mounted to the cooler cabinet and the strike is mounted to the door, in alternative embodiments, the lock can be mounted to the door and the strike mounted to the cabinet. In another embodiment, the strike unit or function can be provided by the outside surface of the door, or a surface provided by a slot within either the door or the cabinet.

As noted above, in an embodiment, the lockable enclosure is a freezer. Moreover, whether a freezer or a cooler, enclosures having sliding rather than hinged doors may also benefit from application of the disclosed principles. Referring to FIG. 1B, typically such enclosures 1A include two doors mounted in tracks adjacent to but offset from one another, with one or both doors being slidable across the front of the cooler. In such coolers, each door may also include a gasket on one or both of the door and the cabinet, used to seal the door and cabinet together when the door is closed. The sliding doors are typically biased to slide back to the closed position in the event that the user does not properly slide the door to the closed position. For sliding door coolers, the lock can be applied to either the door or the cabinet of each door, or, a lock can be applied to one door and the strike can be applied to the other door, such that when the lock and strike are engaged, neither door can slide open or parallel to the other door.

Figure 4:
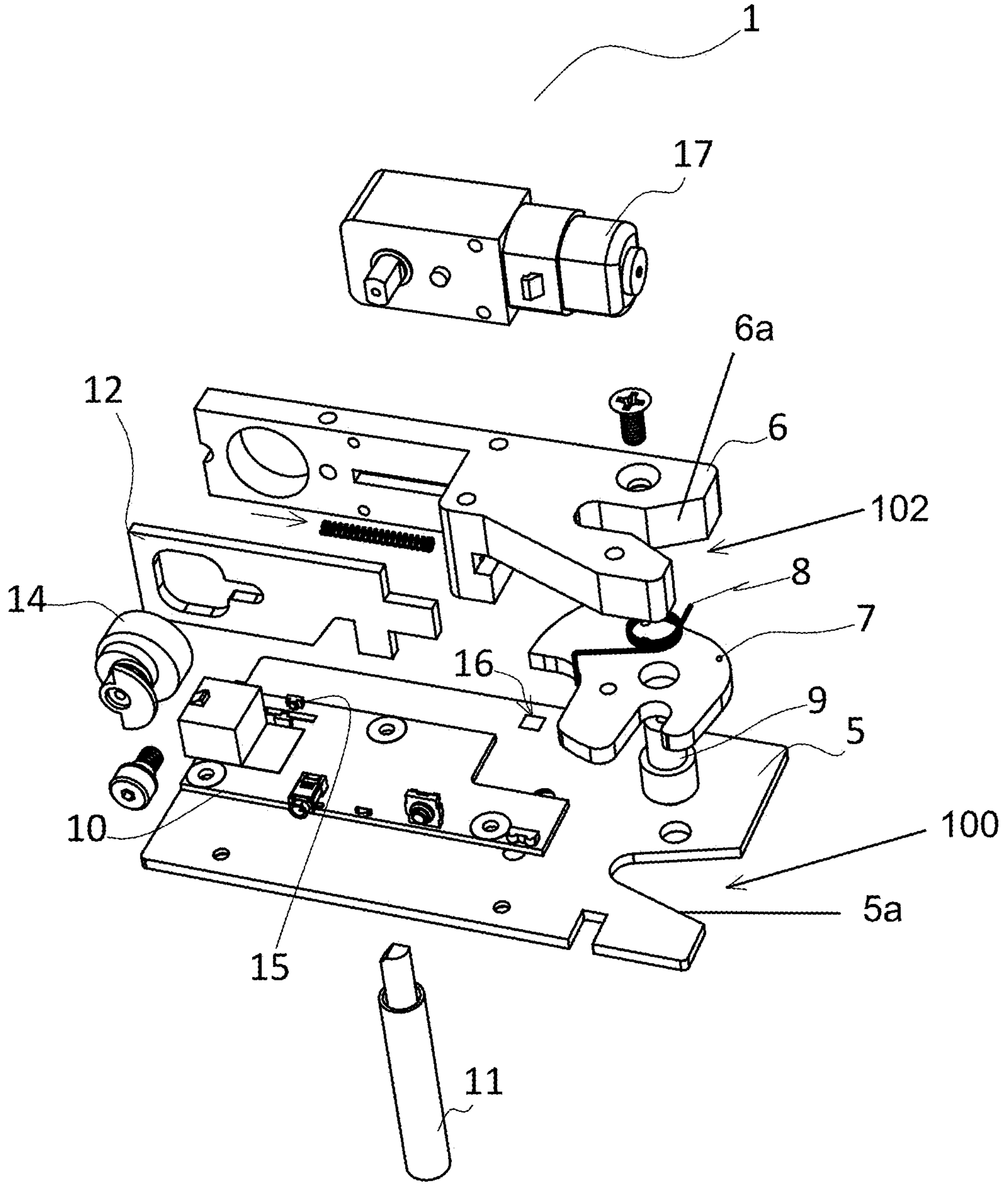
FIG. 4 is a simplified exploded view of the lock structure of FIG. 2 in accordance with an aspect of the disclosure.
Figure 5:
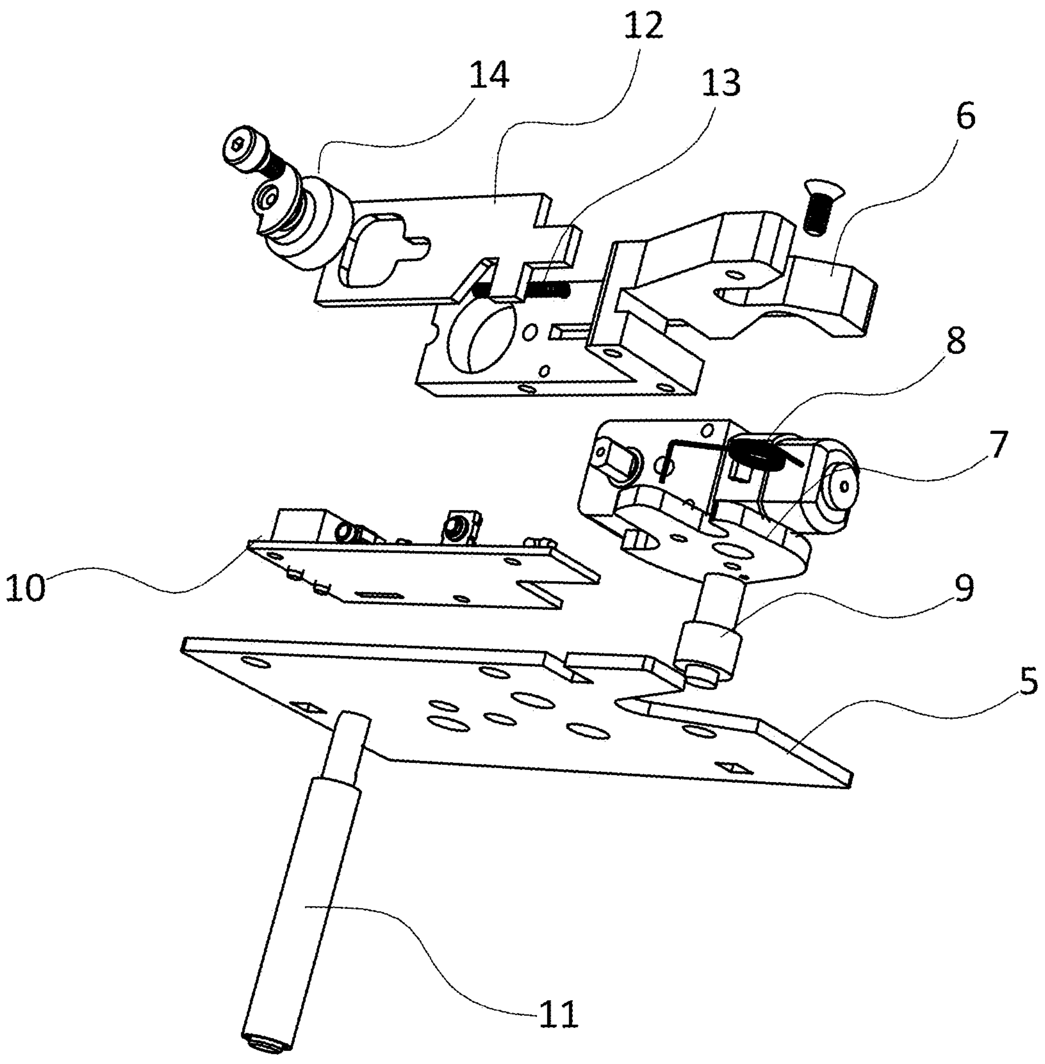
FIG. 5 is a further simplified exploded view of the lock structure of FIG. 2 in accordance with an aspect of the disclosure.
Figure 6:
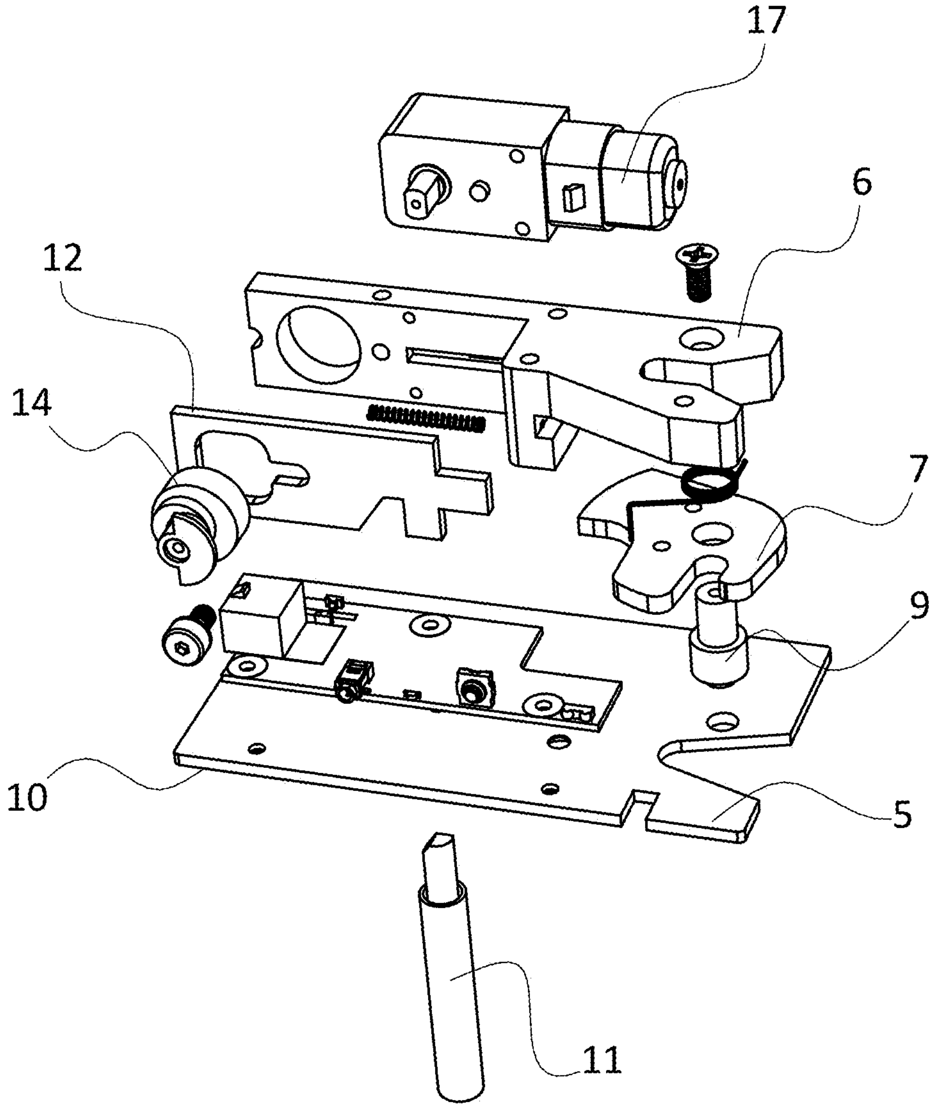
FIG. 6 is a further simplified exploded view of the lock structure of FIG. 2 in accordance with an aspect of the disclosure.
Figure 7:
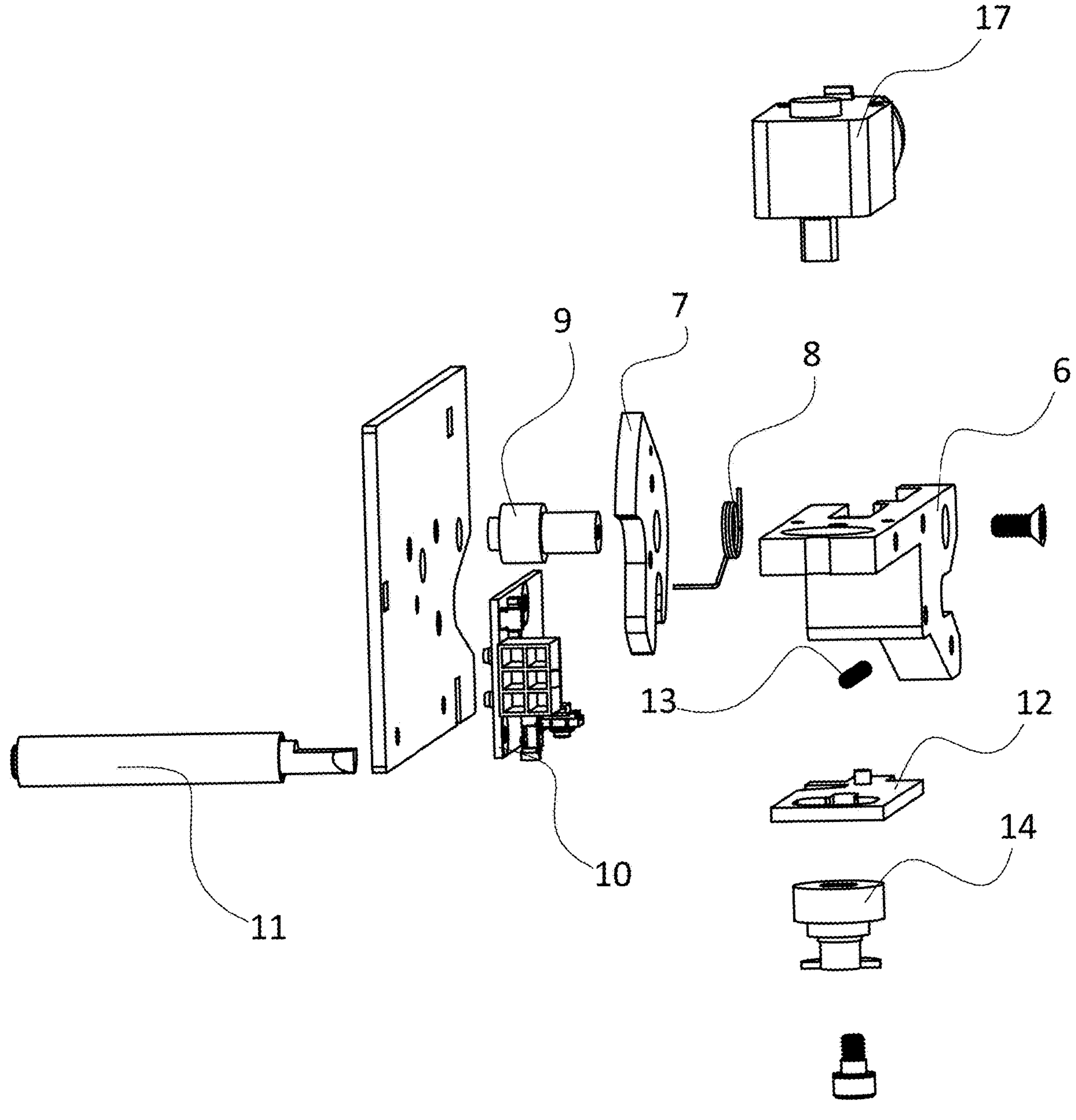
FIG. 7 is a further simplified exploded view of the lock structure of FIG. 2 in accordance with an aspect of the disclosure.

In any case, the lock mechanism consists of a number of components as labeled in FIG. 4 and as shown in different views in FIGS. 5-7. The components include the mounting base 5, latch base 6, claw 7 (i.e., the claw portion of latch 4), claw spring 8, shaft 9, circuit board 10, manual release push rod 11, slider 12, slider spring 13, cam 14, cam sensor 15, claw sensor 16, and motor 17. The components are primarily mounted to the latch base 6 and the mounting base 5, which are stationary. The mounting base 5 has a "V" shaped opening 100 and an angled surface 5*a*, and helps to guide the strike to connect to the claw 7 properly when the door is closed. The latch base 6 has a "Y" shaped opening 102 and an angled surface 6*a*, and serves to help guide the strike to connect to the claw 7 properly when the door is closed. The claw 7 rotates clock-wise and against the force of the claw spring 8 as the door is closed and it receives the strike. The force of the claw spring 8 is ideally light enough so the force of the door closing will overcome the claw spring force and the claw 7 will receive the strike and rotate clock-wise.

Figure 8:
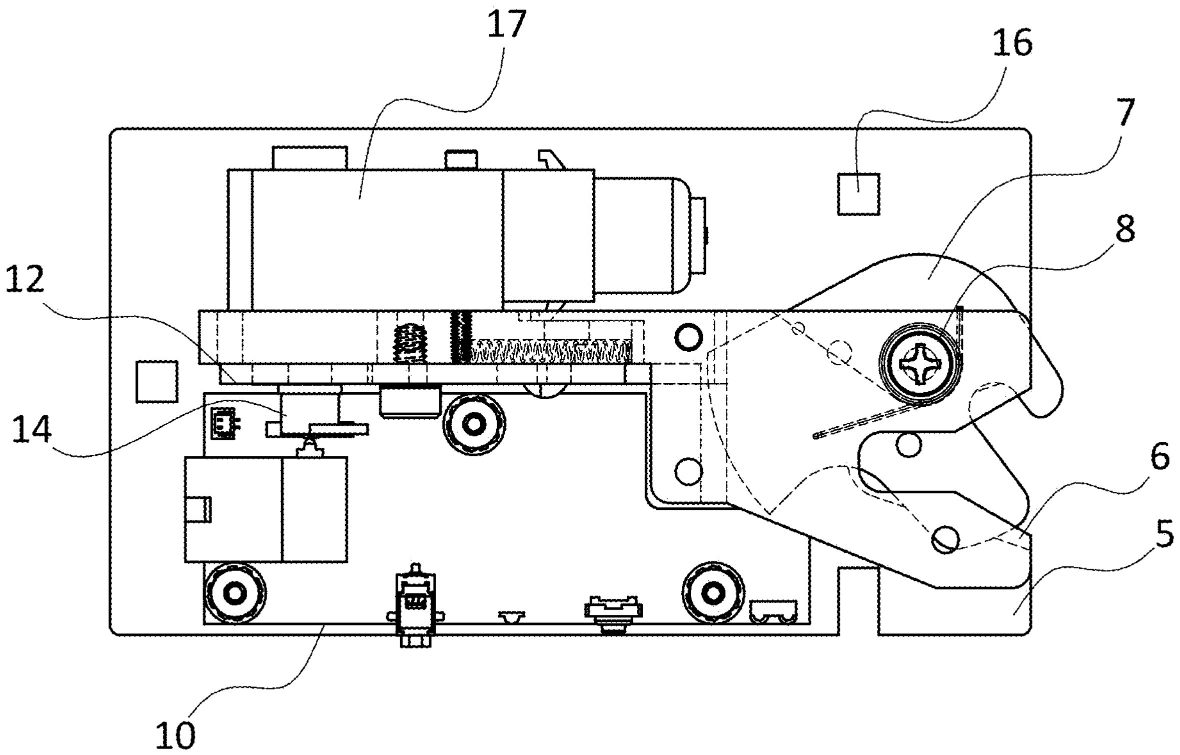
FIG. 8 is a further simplified interior view of the cooler locking structure of FIG. 2 in accordance with an aspect of the disclosure.
Figure 9:
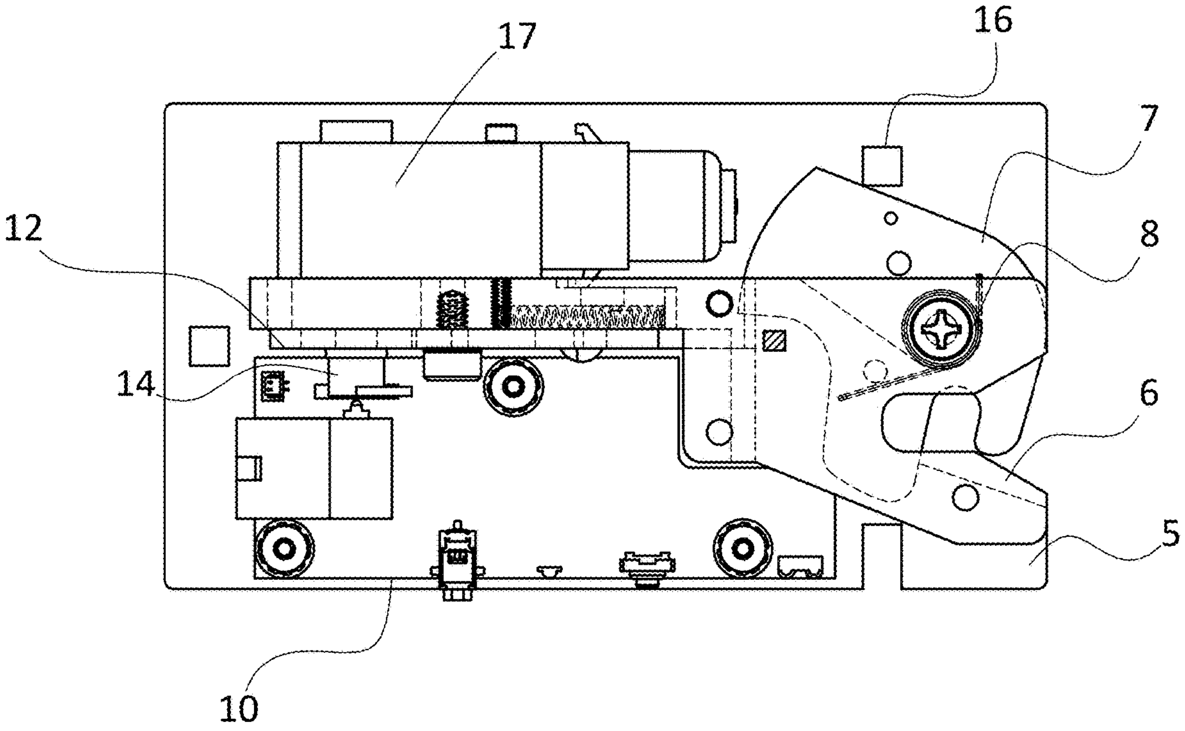
FIG. 9 is a further simplified interior view of the cooler locking structure of FIG. 2 in accordance with an aspect of the disclosure.

In the strike received position of FIG. 9, the claw sensor 16 will detect that the claw 7 has received the strike. The claw spring 8 is biased to push the claw 7 out so when the door is opened the claw 7 will rotate counter-clockwise to move to the receive position as in FIG. 8. This cycle whereby the claw 7 rotates clockwise to counterclockwise while the door moves from closed to open repeats over and over again as food or other material is being vended from the cooler, as shown in FIGS. 8 and 9.

Figure 10:
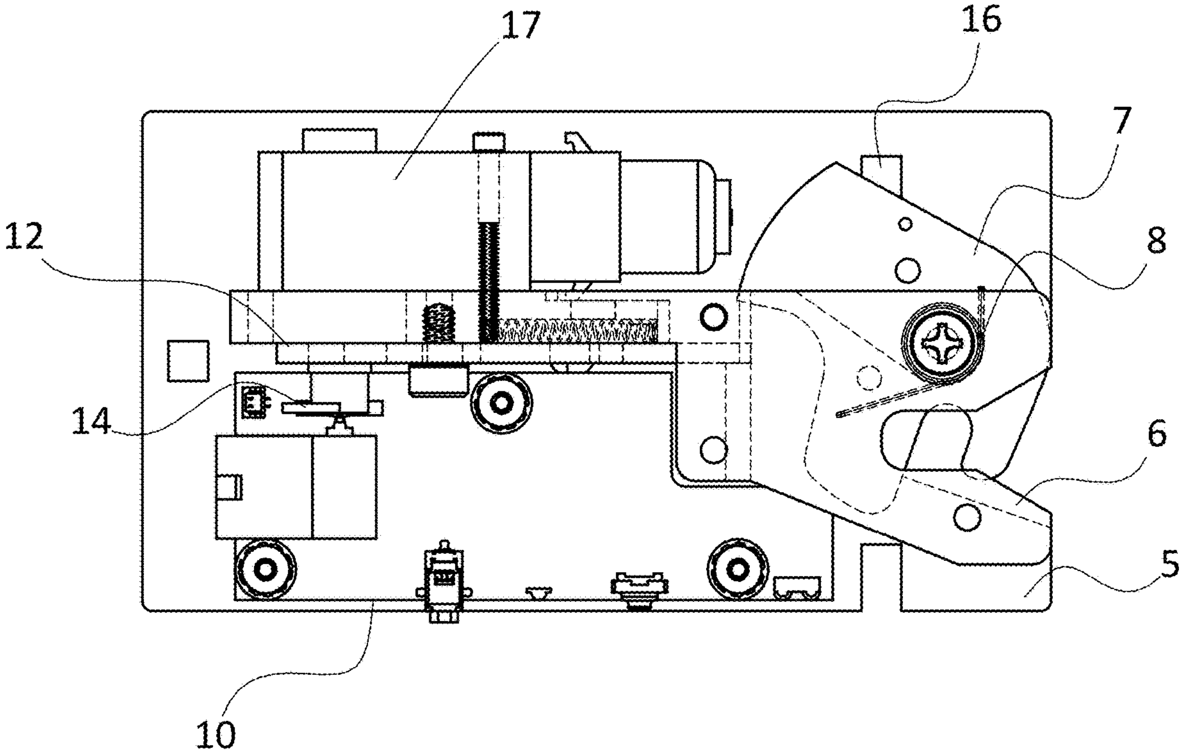
FIG. 10 is a further simplified interior view of the cooler locking structure of FIG. 2 in accordance with an aspect of the disclosure.

The slider 12 when extended to the right acts to lock the claw 7 holding the strike in the clockwise rotated position during certain conditions while the door is closed, as shown in FIG. 10. The slider 12 is biased to the locked extended position by the slider spring 13 when the door is intended to be locked. The cam 14 connected to the motor 17 will act to move the slider 12 via the inner surface of the slider 12 to the unlocked position upon being energized by the circuit board 10 as shown in FIG. 9. A cam sensor 15 on the circuit board 10 senses the position of the cam 14 to determine the slider 12 has moved to the required position.

Figure 11:
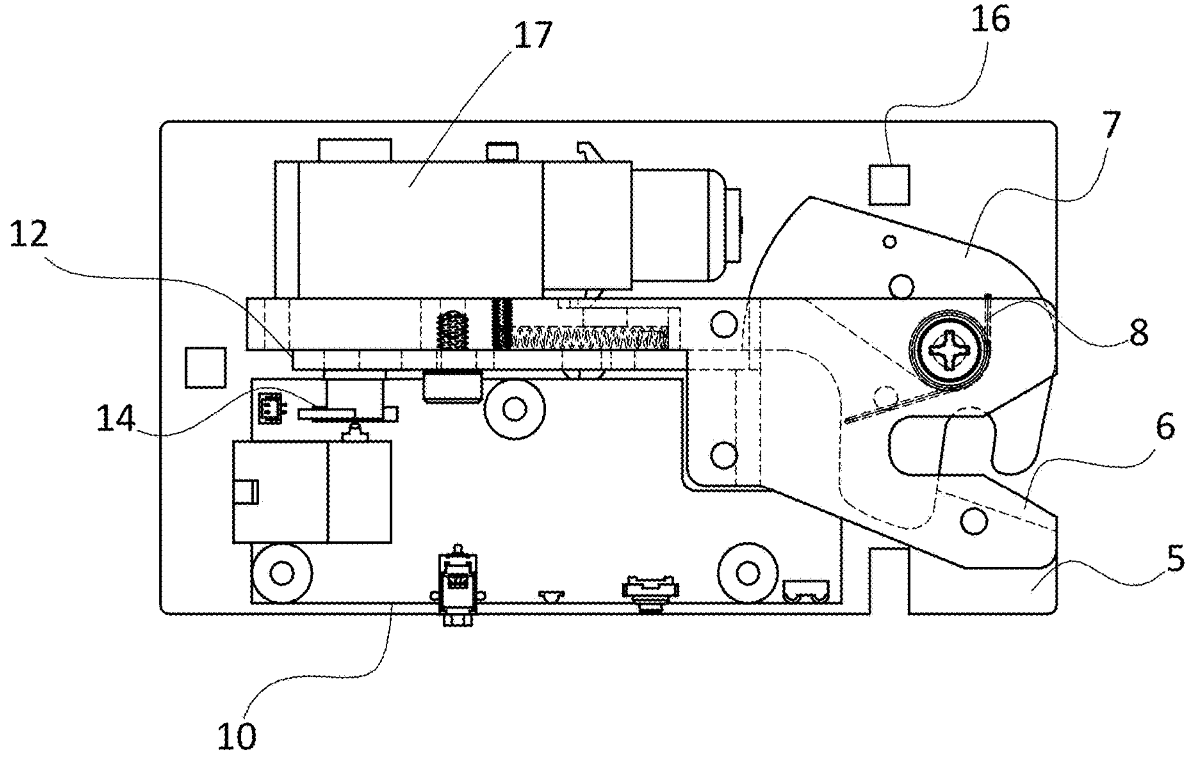
FIG. 11 is a further simplified interior view of the cooler locking structure of FIG. 2 in accordance with an aspect of the disclosure.
Figure 12:
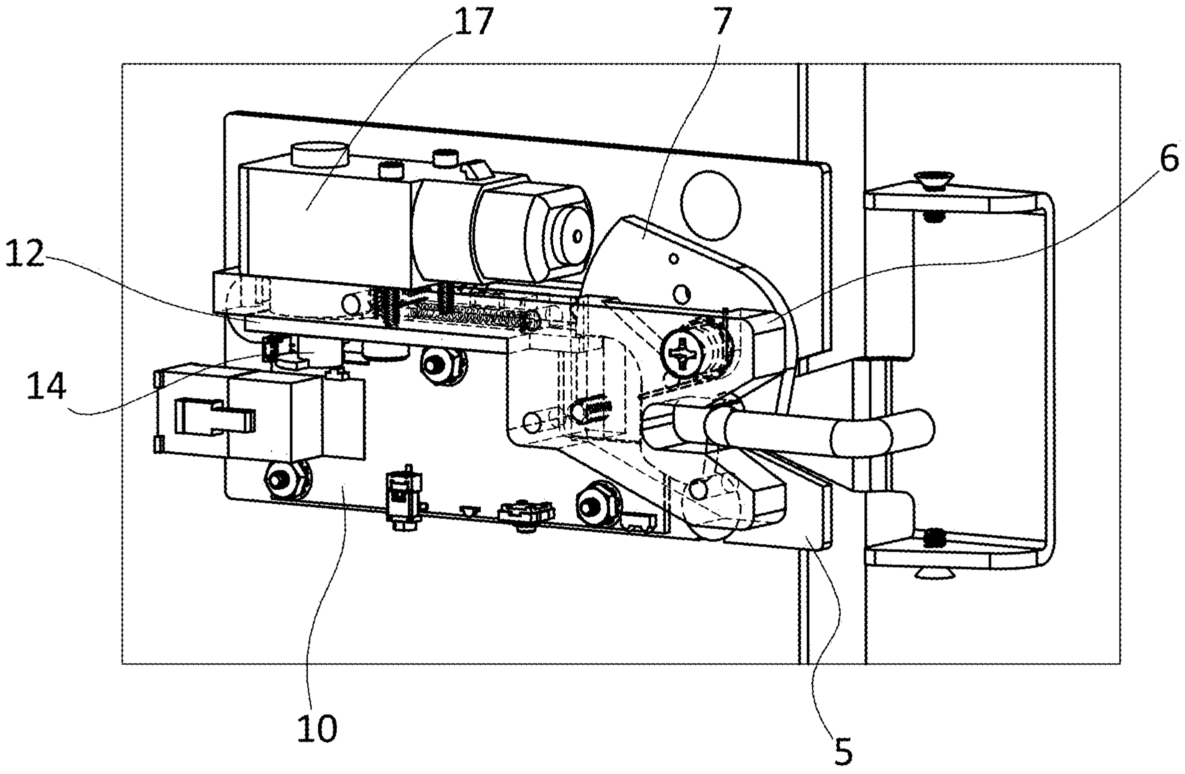
FIG. 12 is a further simplified interior view of the cooler locking structure of FIG. 2 in accordance with an aspect of the disclosure.

Once the slider 12 moves to the far right extended position behind the rear surface of the claw 7, the claw 7 will no longer be able to rotate counter-clockwise as the door is attempted to be opened as shown in FIG. 11; the rear surface of the claw 7 is blocked from rotating counterclockwise by the right extended edge of the slider 12. Thus, the claw 7 and extended slider 12 will serve to hold the strike in the position in FIG. 12 to keep the door closed or locked. Once the electronics determine the door should be unlocked, the motor 17 rotates and moves the cam 14 so that it applies a force to the slider 12 to make it retract, such that the slider 12 will no longer be in a position to hold the claw 7 in the full clockwise position as in FIG. 9. The claw will then be free to rotate counterclockwise as the door is pulled opened as in FIG. 8.

The manual release 11 serves to manually force the slider 12 from the rightward position to the leftward retracted position to release the slider interference from the claw 7, and allowing the door to be opened. The feature is useful in the event that a person, for example a child, climbs into the cooler and the cooler door closes and locks. A person inside the cooler can push the manual release 11, serving to apply a force to the inclined surface of the slider 12 so the slider 12 retracts by overcoming the force of the slider spring 13 and retracting to the let to release the lock. As an alternative to the push-rod method, a cable can be attached to, for example, the left end position of the slider 12 to pull the slider 12 to the retracted position to release the claw 7 and unlock the unit.

Figure 13:
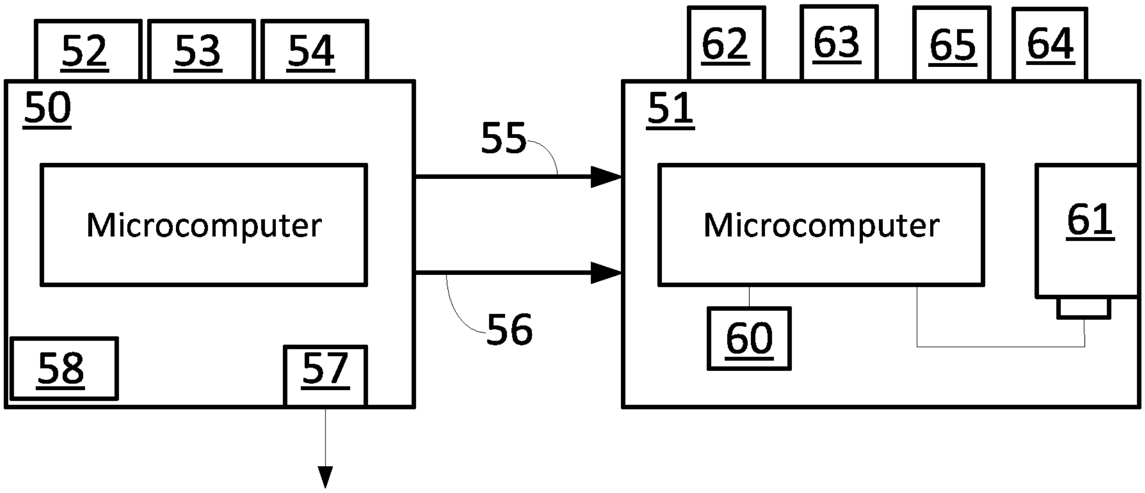
FIG. 13 is a simplified circuit diagram in accordance with an aspect of the disclosure.

In this embodiment, the cooler controller 10 comprises sensors and inputs for measuring a temperature of the enclosure 1 it is locking and unlocking; see FIG. 13. In one example, the cooler controller will control the actuator of an electronic lock mechanism based on the temperature of the enclosure. The cooler 1 has a refrigerator for maintaining products at a temperature around or below 42° F. As long as the temperature is maintained below the desired temperature of 42° F., the cooler can be opened by any patron who desires to open the door, so that the patron can select a product to be purchased.

When the door is closed, the strike mounted on the door is engaged with the latch mounted to the cabinet (or vice versa in an alternative embodiment). If the temperature is proper, for example 42° F. or less, and when the door is pulled open, the latch mechanism allows the strike to be released and the door will swing open. The temperature of the cooler can be communicated remotely over a local or wide-area network.

In the event that the temperature of the cooler exceeds a pre-determined limit for a period of time such as 45 minutes, there is a risk of spoilage of the food or beverage in the cooler. Thus, in an embodiment, when this occurs, the cooler controller proceeds to enable the lock controller and in turn the lock controller energizes the motor and latches the strike so that the door is locked and cannot be withdrawn from the cabinet. The locking event can be communicated remotely over a local or wide-area network. If the temperature returns to a safe/proper temperature, it may be possible for the controller to determine the contents are safe to consume because the cooler temperature only stayed in the elevated range for a short period of time, i.e., too short for the food to spoil. In such a case, the controller may unlock the door.

In another example, the status of the sensors is communicated to a person remote to the cooler over a local or wide-area network, and this person may send a remote signal or command the controller to unlock the controller. As an alternative, the lock controller can also provide a local interface to an electronic or mechanical key or a keypad to signal the controller to unlock the door as shown in FIG. 13.

The latch provides a sensor for detecting the strike releasing from the latch and thus the door swinging open. This door opening sensor can be useful by the controller for measuring the time the door remains open, and alerting someone either locally or remotely (and/or storing this data remote to the cooler) that the door is open for too long to avoid spoilage of food or other items in the cooler.

The latch also comprises a sensor for detecting the locked/unlocked position of the latch. As the motor controls the latch to change states from locked to unlocked, or from unlocked to locked, the sensor will detect the change of state so the lock controller can properly control the state of the latch and report the state of the latch to a device external to the cooler.

The controllers may be powered by AC line voltage and by a battery as a back-up for example. The advantage of the combination of both the AC power and the battery is that the lock controller will be powered primarily from the AC power while it is assumed the cooler will also have the same AC power for operating the refrigerator. Thus the refrigerator should normally be successful keeping the temperature at or below 42° F. If and when the AC voltage is lost for an extended time period, it is expected the temperature in the cooler will increase to a temperature and for a time period that could cause the food and/or beverages to spoil. In the event of lost power, the controller has the capability, in an embodiment, to control the lock actuator to lock the door, or to latch the strike so the door cannot be withdrawn.

During the time that AC power is lost, the controller may be configured to continue to monitor all the sensors, such as for example, the temperature sensor, and also to measure elapsed time. Thus by conducting these measurements during a power outage, the controller(s) can determine if the temperature has exceeded certain undesirable levels for an extended period of time, in order to determine if the cooler can be unlocked to allow products to be distributed once the AC power resumes. In addition, the controllers can communicate status of the power and the sensor measurements during the power outage event.

In the event of a temperature limit event, the controllers may also serve to control alternative devices related to the cooler, such as the lighting for the cooler. For example, if the temperature limit is exceeded, the controller may be configured to turn off the lights of the cooler, to discourage patrons from trying to access the cooler (a cooler without lights would visually indicate the cooler has a malfunction).

Another feature of the cooler lock is to lock the door based on a timer or a schedule regardless of cooler temperature. For example, if the cooler is in an office that is typically closed after 6 PM, the cooler may be automatically locked after 6 PM to discourage maintenance or cleaning crews from taking items from the cooler. If the office re-opens at 8 AM, the cooler would unlock at approximately that time.

In another example, the cooler lock can be in a default locked state. In this embodiment, the patrons can select which products they intend to purchase before opening the cooler door and removing the products. After the products are selected and payment is collected or authorized by credit or debit card, the cooler door can be unlocked for either a) a short period of time, or b) a single access event so the customer can remove the purchased products. In this example, in the event the cooler temperature exceeds certain limits or power is lost as described above, the cooler would remain locked and the customers would be discouraged from paying for products.

Figure 14:
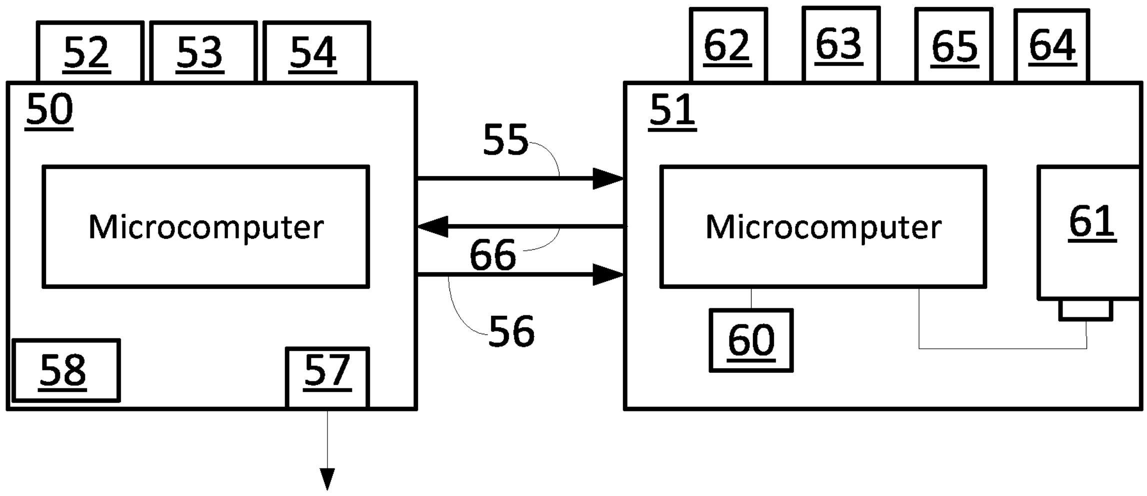
FIG. 14 is a simplified circuit diagram in accordance with an alternative aspect of the disclosure.

In another embodiment, the access control system further includes additional features for providing locking and access to a refrigerated cooler as in FIG. 1A. As shown in FIG. 14, while the cooler door is open the slider can move from the unlocked position shown initially in FIG. 8 to the locked position shown in FIG. 14. In FIG. 8, the cooler door is open, the claw is rotated counter clockwise, and the slider is in the unlocked position and retracted from touching the claw. In the event the door is unlocked and a customer opens the door to select a product, it is possible the controller could send a locked signal to the lock. This situation could take place if, for example, the door is left open for too long of a period of time. In this situation, it is desirable to move the slider to the extended locked position while the claw is rotated counter clockwise and to rest on the curved surface of the claw before the door is closed and before the claw is rotated clockwise.

Once the door is closed and then after the strike rotates the claw clockwise, the slider will continue to move to the extended position and block the movement of the claw, and will maintain the claw in the locked counterclockwise position as shown in FIG. 11. This feature provides for locking the cooler door upon closing the cooler door if a lock event is triggered while the cooler door is open. In another embodiment, if the cooler door is open and a lock event is triggered by a failed probe or an over temperature event, the lock delays the locking event until the cooler door is properly shut. This is accomplished by monitoring the door position, and if the door is open during the lock trigger event the lock, delaying going to the locked condition; later upon sensing the cooler door is closed, the lock then moves to the locked position and the door is locked.

In the embodiment, the luck controller can provide a reset signal to the cooler controller as described below. The reset signal source can come from another source, for example from a separate switch in a secured location (not shown) that is only reached via authorized access. In the event the cooler controller senses a cooler fault and sends the lock signal to the lock controller, and the lock controller locks the cooler door, the service technician must provide a system for repairing the equipment and resetting the lock and cooler controller. Once the lock controller has locked the cooler door, the lock controller is configured to sense a secured signal to indicate the cooler has been repaired and should be reset back to the unlocked condition. In this embodiment, the lock controller will sense a signal via the keypad or the key sensor, and when this signal is received the lock controller will unlock the cooler door and send a reset signal to the cooler controller, and the cooler controller will release lock signal to the lock controller. In another embodiment, the lock or cooler controller will sense a reset signal from a mechanical switch accessible by a mechanical or electronic lock.

Upon either a power-up condition or upon receiving a reset signal from the lock controller, the cooler controller will wait for the cooler to begin cooling and the temperature to reach a low temperature, for example 37° F. before proceeding to the lock control measurement algorithm. Prior to reaching the lower temperature. e.g., 37° F. the cooler controller will continue to output the unlock signal. Once a temperature of 37° F. or below is attained, the cooler controller begins the lock control algorithm and continues to output the unlock signal since the temperature is proper. Once the cooler controller measures a higher than normal temperature for a certain time period (over-temperature time), for example 42° F. for 15 minutes, the cooler controller will send the lock controller the lock signal.

The cooler or lock controller may be powered by a battery and may be programmed to lock the cooler door after loss of AC power, regardless if the temperature has exceeded the temperature limit of 42° F. This will insure the cooler door will be locked before the back-up battery has depleted, and it would be too late to lock the cooler door.

In an embodiment a service mode of operation is provided, whereby the cooler and lock controllers are placed into an operation mode that will not provide for the cooler door to be locked for a period of time typically longer than the over-temperature trigger time (for example ½ hour), so that the cooler can stand open and be loaded with products. After the service mode time period, the cooler controller resumes monitoring for a temperature default. It is desirable to exit the service mode after one single service mode time period, and to restrict consecutive service mode time periods.

As an alternative to a manually-entered service mode, in an embodiment, the cooler controller intelligently controls the service mode of the cooler by measuring the temperature rate of change. For example, if the temperature of the cooler rises above 42 degrees this could be due to either a fault of the cooler, or due to the cooler being refilled or serviced. After being filled or serviced, the door is closed and the temperature should begin to decrease rapidly toward the proper level provided the cooler is functioning properly. In this embodiment, when the cooler temperature exceeds the over-temperature trigger time while it is in the process of rapidly cooling down, the controller logic refrains from locking the cooler because as the controller measures the rapid rate of temperature change it can determine that a service condition is in process and determine to not lock the door, since it has determined that the temperature variation is not a faulty cooler refrigeration condition.

The cooler controller may also sense for a failed temperature probe in an embodiment, and may communicate a cooler lock event with the lock controller. The time period that the cooler controller senses for the failed probe before the lock signal is communicated from the cooler controller to the lock controller is typically shorter than the over-temperature delay time as described above. It is desirable to quickly lock the door in the event of a temperature probe fault because the integrity of the entire cooler system is in question, and the risk of serving spoiled food is minimized by locking the door. The cooler locking system may also include a test switch (not shown, typically mounted in a location that is easily accessible without the use of tools) that will be used by an equipment technician or health inspector to simulate an over-temperature condition or a failed probe condition to determine if the lock if functioning properly. In a working system, when the test switch is activated, the controller will sense (erroneously) that there is a malfunction of the cooler or the probe and will send a lock signal to the lock, and the cooler will proceed to lock. The system will return to normal operation after the switch is deactivated or if the system receives another signal, such as an access signal from the key or a reset signal.

Figure 15:
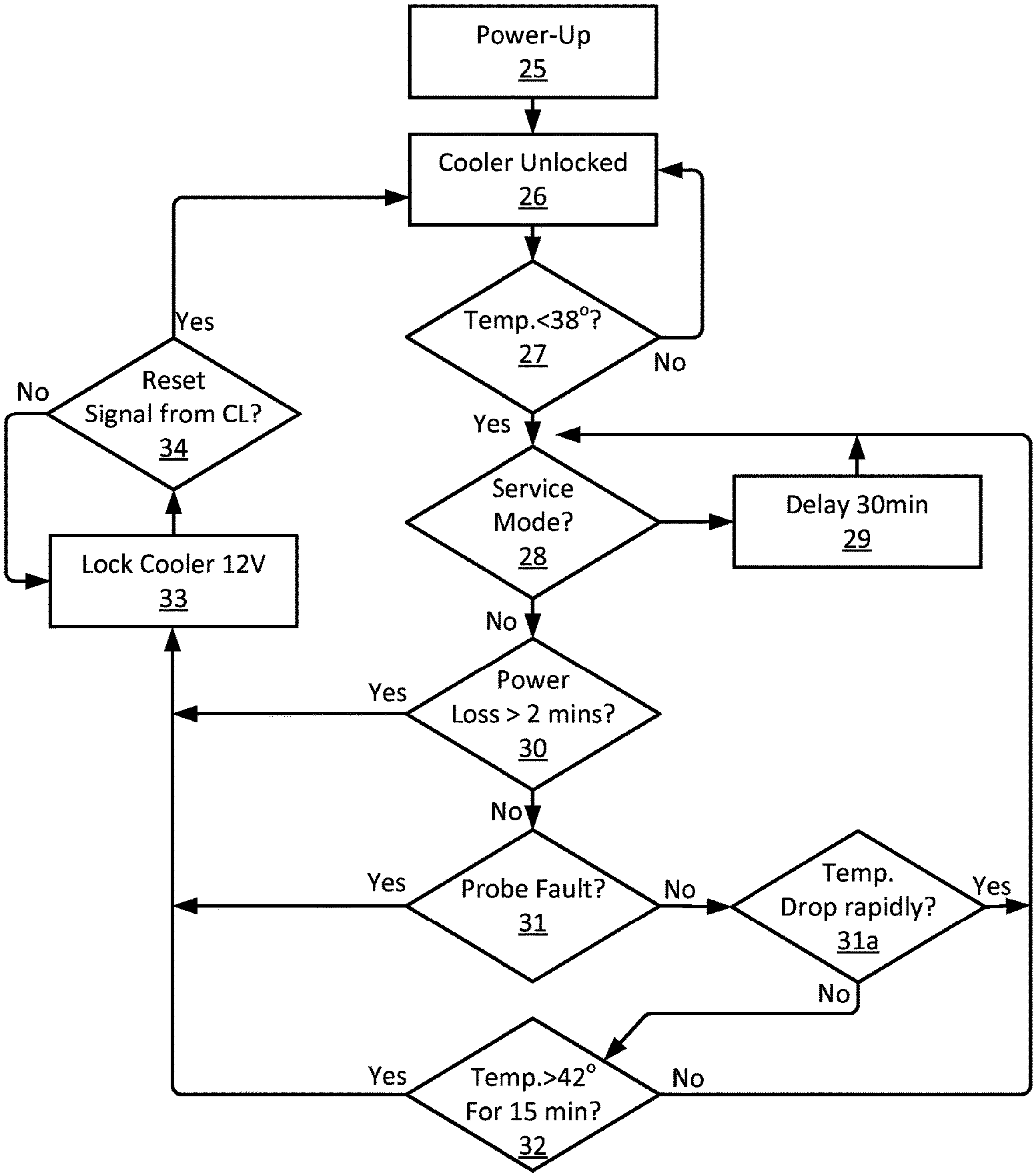
FIG. 15 is a process flow chart illustrating a process executed by a cooler controller in an embodiment.
Figure 16:
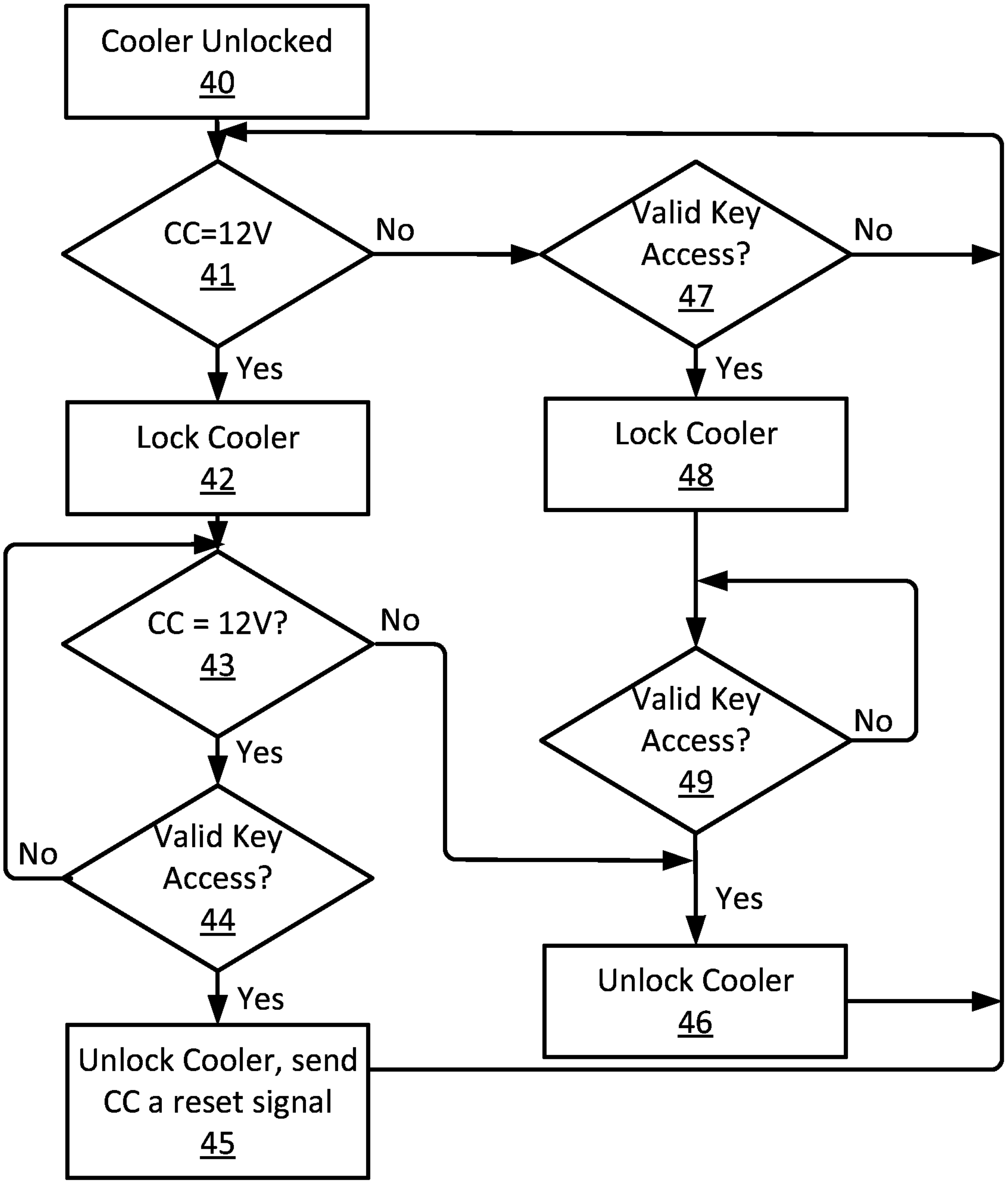
FIG. 16 is a process flow chart illustrating a process executed by a lock controller in an embodiment.

FIGS. 15 and 16 describe an example of the control logic of the cooler controller (CC) and the cooler lock (CL) in greater detail. Referring to FIG. 15 first, the cooler controller process begins at stage 25, wherein the system powers up. Subsequently at stage 26, the cooler is unlocked. e.g., the cooler controller outputs a 0V signal to the lock. The cooler controller then determines at stage 27 whether the internal temperature of the cooler is at or below a threshold value such as 38° F. If the temperature is determined to be at or below the threshold value, the process continues to stage 28, wherein the cooler controller determines if the system is in service mode as described above. In the event that the system is in service mode, the process flows to stage 29, wherein a 30 minute delay, or other suitable delay period, is imposed and the process flows back into stage 28.

If instead it was determined that the system is not in service mode, the process flows to stage 30, wherein the cooler controller determines whether there has been a power loss exceeding some time threshold, such as 2 minutes. If so, the process flows to stage 31, wherein the cooler controller determines whether there is a probe fault, and if there is not, the process continues to stage 31*a*. At stage 31*a*, if the measured temperature is decreasing at a rapid rate, it is assumed the cooler is working properly and it may have been recently opened for service or re-filling, and thus it should remain unlocked and should not proceed to stage 32. If the temperature is not decreasing at a rapid rate, the process flows to stage 32. At stage 32, the cooler controller determines whether the internal temperature has been above a second threshold temperature, e.g., 42° F. for greater than a predetermined period. e.g., 15 minutes.

In the event that the temperature has not been above the second threshold temperature for greater than the predetermined period, the process flows back to stage 28. Otherwise, the process flows to stage 33, wherein the cooler controller locks the cooler, e.g., by sending a 12V signal to the lock motor. From stage 33, the cooler controller determines at stage 34 whether a reset signal has been received, and if such a signal has been received, the process returns to stage 26. Otherwise, the process flows back to stage 33.

Returning to the decision stages 30 and 31, if either of these stages results in an affirmative determination (yes, probe faulted and/or yes power lost for greater than the prescribed period), then the process flows immediately to stage 33. From there, the process continues as described above.

Turning to FIG. 16, this figure shows the control process from the standpoint of the cooler lock controller. Starting at stage 40, the cooler is unlocked. Next at stage 41, it is determined whether a 12v (lock) signal is received from the cooler controller. If so, the cooler lock locks at stage 42. Subsequently at stage 43, the lock controller determines whether CC is set. e.g., whether it reads 12V. If so, the controller checks for a valid key access at stage 44. If a valid key access is detected at stage 44, the process continues to stage 45, wherein the lock controller unlocks the cooler and sends a cooler controller reset signal.

If at stage 43 it is determined that COF is not set, then the process flows to stage 46 to unlock the cooler and then returns to stage 41. If at stage 44 it is determined that there is no valid key access, then the process returns to stage 43.

If at stage 41 it determined that a 12v (lock) signal is not received from the cooler controller, the process looks for a valid key access at stage 47, and if such access is not found, proceeds back to stage 41. Otherwise, the process flows to stage 48, and the cooler is locked. Subsequently at stage 49, is again determined whether a valid key access has occurred. If so, the process moves on to stage 46 and continues thence as described above. If, however, no valid key access is found, the process loops at stage 49.

As noted above, FIG. 13 is a simplified schematic of a control system usable to implement the processes described herein. The illustrated system includes primarily a cooler controller 50 and a lock controller 51. Both controllers may be, for example, microcomputer or microprocessor-based controllers. In an alternative embodiment, the two microcomputers may be integrated together into a single microcomputer controller.

The cooler controller 50 includes inputs for power 52 and a temperature probe 53. The cooler controller 50 also includes outputs, e.g., for light control 54, lock control 55, lock controller power 56, as well as an Ethernet or other data connection 57 to access a LAN or a WAN, such as the Internet. The cooler controller 50 may also include a battery 58 for back-up purposes.

The lock controller 51 includes a clock 60 and a lock actuator 61. The lock controller 51 also includes inputs for a key sensor 62, a keypad 63, a door sensor 64, and a latch position sensor 65. In an embodiment wherein a reset capability is included, the system also includes a reset line 66 providing input from the lock controller 51 to the cooler controller 50, as shown in FIG. 14.

It will be appreciated that a new and useful system for cooler lock function and control has been disclosed and described herein. However, while the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure are broader than the embodiments specifically disclosed and are encompassed within the claims appended hereto.

While certain features are described in conjunction with specific embodiments of the invention, these features are not limited to use with only the embodiment with which they are described, but instead may be used together with or separate from, other features disclosed in conjunction with alternate embodiments of the invention.

The invention claimed is:

1. A retail controller system for selectively allowing consumers to select one or more items from a retail enclosure, the system comprising:

at least one controller comprising a first microcomputer configured to generate an unlock signal subsequent to one of a consumer purchase and a consumer authorization to make a purchase;

the at least one controller further comprising a second microcomputer connected to one of a local and a wide area network for communicating one of the unlock signal, a patron payment information and a patron payment authorization information; and the at least one controller further configured for being in communication with an electronically actuated locking mechanism, the locking mechanism being configured in a locked condition during stand-by operation and being further configured to selectively move to an unlocked condition upon receiving the unlock signal.

2. The retail controller system of claim 1 wherein the at least one controller is further configured for communicating patron identification information.

3. The retail controller system of claim 1 wherein the unlock signal is a secure signal.

4. The retail controller system of claim 1 wherein the unlock signal is generated external to the retail enclosure in a secured location.

5. The retail controller system of claim 1 wherein the at least one controller is adapted to communicate information about a product selected.

6. The retail controller system of claim 1 wherein the at least one controller is adapted to communicate information about a fault condition.

7. The retail controller system of claim 1 wherein the at least one controller is adapted to communicate information about a temperature of the retail enclosure.

8. A retail controller system for selectively allowing consumers to select one or more items from a retail enclosure, the system comprising:

at least one controller comprising a first microcomputer connected to one of a local and a wide area network configured to communicate an unlock signal, the unlock signal generated subsequent to one of a consumer purchase and a consumer authorization to make a purchase;

the at least one controller further comprising a second microcomputer connected to one of a local and a wide area network for communicating one of patron payment information and a patron payment authorization information; and the at least one controller further configured for being in communication with an electronically actuated locking mechanism, the locking mechanism being configured in a locked condition during stand-by operation and being further configured to selectively move to an unlocked condition upon receiving the unlock signal.

9. The retail controller system of claim 8 wherein the at least one controller is further configured to be connected to one of a local and a wide area network for communicating one of a lock operation controller parameter and a retail enclosure door position signal.

10. The retail controller system of claim 8 wherein the at least one controller is further configured to be connected to one of a local and a wide area network for communicating a second unlock signal generated upon an initiation of a service operation.

11. The retail controller system of claim 8 wherein the at least one controller is further configured for communicating patron identification information.

12. The retail controller system of claim 8 wherein one of the first and the second microcomputer is further configured to generate the unlock signal.

13. The retail controller system of claim 8 wherein the unlock signal is a secure signal.

14. The retail controller system of claim 8 wherein the unlock signal is generated external to the retail enclosure in a secured location.

15. The retail controller system of claim 8 wherein the at least one controller is adapted to communicate information about a product selected.

16. The retail controller system of claim 8 wherein the at least one controller is adapted to communicate information about a fault condition.

17. A retail controller system for selectively allowing consumers to select one or more items from a retail enclosure, the system comprising:

at least one controller configured to generate an unlock signal subsequent to one of a consumer purchase and a consumer authorization to make a purchase;

the at least one controller connected to one of a local and a wide area network for communicating the unlock signal;

the at least one controller further connected to one of a local and a wide area network for communicating one of a lock operation controller parameter and a retail enclosure door position signal; and the at least one controller further configured for being in communication with a locking mechanism, the locking mechanism being configured in a locked condition during stand-by operation and being further configured to selectively move to an unlocked condition upon receiving the unlock signal.

18. The retail controller system of claim 17 wherein the unlock signal is a secure signal.

19. The retail controller system of claim 17 wherein the unlock signal is generated external to the retail enclosure in a secured location.

20. The retail controller system of claim 17 wherein the at least one controller is adapted to communicate information about a product selected.

21. The retail controller system of claim 17 wherein the lock operation controller parameter is an unlock response signal.

22. The retail controller system of claim 17 wherein the lock operation controller parameter is a reset signal.

23. The retail controller system of claim 17 wherein the lock operation controller parameter is a locking mechanism position signal.

24. The retail controller system of claim 17 wherein the lock operation controller parameter is a latch position signal.

25. The retail controller system of claim 17 wherein the at least one controller is adapted to communicate information about a fault condition.

26. The retail controller system of claim 17 wherein the at least one controller is adapted to communicate information about a temperature of the retail enclosure.

27. A retail controller system for selectively allowing consumers to select one or more items from a retail enclosure, the system comprising:

at least one controller configured to generate a first unlock signal subsequent to one of a consumer purchase and a consumer authorization to make a purchase;

the at least one controller connected to one of a local and a wide area network for communicating the first unlock signal;

the at least one controller further connected to one of a local and a wide area network for communicating a second unlock signal generated upon an initiation of a retail enclosure service operation; and the at least one controller further configured for being in communication with an electronically actuated locking mechanism, the locking mechanism being configured in a locked condition during stand-by operation and being further configured to selectively move to an unlocked condition upon receiving one of the first unlock signal and the second unlock signal.

28. The retail controller system of claim 27 wherein one of the first unlock signal and the second unlock signal is a secure signal.

29. The retail controller system of claim 27 wherein one of the first unlock signal and the second unlock signal is generated external to the retail enclosure in a secured location.

30. The retail controller system of claim 27 wherein the at least one controller is adapted to communicate information about a fault condition.

31. The retail controller system of claim 1 wherein the at least one controller is further configured to be connected to one of a local and a wide area network for communicating one of a lock operation controller parameter and a retail enclosure door position signal.

32. The retail controller system of claim 27 wherein the at least one controller is further configured to be connected to one of a local and a wide area network for communicating one of a lock operation controller parameter and a retail enclosure door position signal.

33. The retail controller system of claim 1 wherein the at least one controller is further configured to be connected to one of a local and a wide area network for communicating a second unlock signal generated upon an initiation of a service operation.

34. The retail controller system of claim 17 wherein the at least one controller is further configured to be connected to one of a local and a wide area network for communicating a second unlock signal generated upon an initiation of a service operation.

35. The retail controller system of claim 17 wherein the at least one controller is further configured for communicating patron identification information.

36. The retail controller system of claim 27 wherein the at least one controller is further configured for communicating patron identification information.

37. The retail controller system of claim 27 wherein the at least one controller is adapted to communicate information about a product selected.

38. The retail controller system of claim 8 wherein the at least one controller is adapted to communicate information about a temperature of the retail enclosure.

39. The retail controller system of claim 27 wherein the at least one controller is adapted to communicate information about a temperature of the retail enclosure.

* * * * *